United States Patent [19]

Himuro

[11] Patent Number: 5,711,828
[45] Date of Patent: Jan. 27, 1998

[54] PNEUMATIC TIRES

[75] Inventor: Yasuo Himuro, Tachikawa, Japan

[73] Assignee: Bridgestone Corporation, Tokyo, Japan

[21] Appl. No.: 434,269

[22] Filed: May 3, 1995

[30] Foreign Application Priority Data

Jun. 21, 1994 [JP] Japan .................................. 6-139136

[51] Int. Cl.$^6$ .................................................. B60C 11/12
[52] U.S. Cl. ................................ 152/209 R; 152/DIG. 3
[58] Field of Search ........................... 152/209 R, 209 D, 152/DIG. 3

[56] References Cited

U.S. PATENT DOCUMENTS

| | | | |
|---|---|---|---|
| D. 364,134 | 11/1995 | Himuro et al. | D12/146 |
| 4,598,747 | 7/1986 | Flechtner | 152/209 R |
| 4,730,654 | 3/1988 | Yamashita et al. | 152/209 R |
| 5,176,765 | 1/1993 | Yamaguchi et al. | 152/209 R |
| 5,198,047 | 3/1993 | Graas et al. | 152/209 R |
| 5,301,727 | 4/1994 | Inoue | 152/209 R |
| 5,435,366 | 7/1995 | Voigt et al. | 152/209 R |
| 5,454,411 | 10/1995 | Weyrich et al. | 152/209 R |

FOREIGN PATENT DOCUMENTS

| | | | |
|---|---|---|---|
| 0 088 876 | 9/1983 | European Pat. Off. | |
| 0 369 932 | 5/1990 | European Pat. Off. | |
| 62-283001 | 12/1987 | Japan . | |
| 133205 | 5/1990 | Japan | 152/209 R |
| 92403 | 4/1991 | Japan | 152/209 R |
| 143707 | 6/1991 | Japan | 152/209 R |
| 143935 | 5/1994 | Japan | 152/209 R |
| 6-135207 | 5/1994 | Japan . | |

*Primary Examiner*—Steven D. Maki
*Attorney, Agent, or Firm*—Sughrue, Mion, Zinn, Macpeak & Seas, PLLC

[57] ABSTRACT

A pneumatic tire running on snow and ice roads has a tread pattern defined in a tread portion by a pair of circumferential grooves dividing the tread portion into a central region and both side regions, a great number of slant grooves arranged in the central region at a given interval in a circumferential direction of the tire and a plurality of zigzag sipes arranged at a given interval in the circumferential direction in each of blocks defined by the circumferential grooves and the slant grooves. In this tread pattern, first slant grooves having a particular small inclination angle and second slant grooves having a particular large inclination angle with respect to the circumferential direction are arranged so that the inclinations of the first and second slant grooves are opposite to each other, and at least one end of each of the zigzag sipes arranged in the same block is opened to the circumferential groove or the first slant groove.

8 Claims, 5 Drawing Sheets

FIG_4
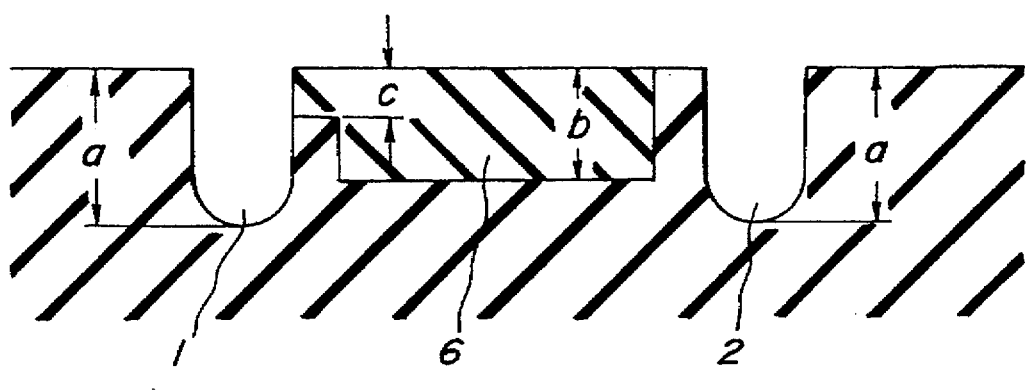
FIG_5
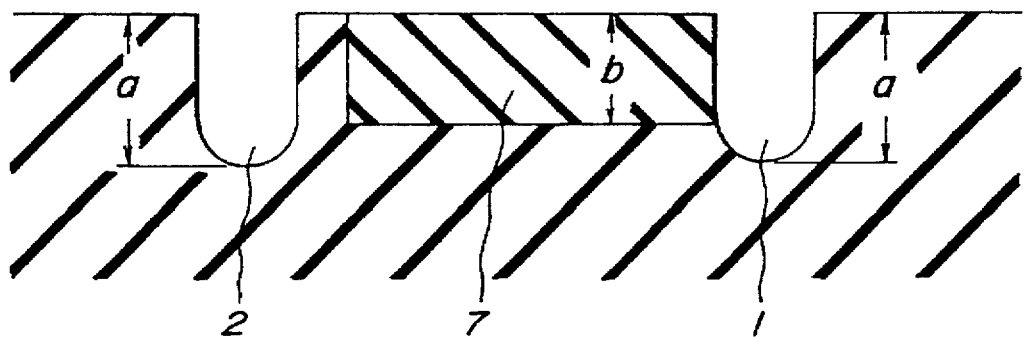

FIG_6
PRIOR ART
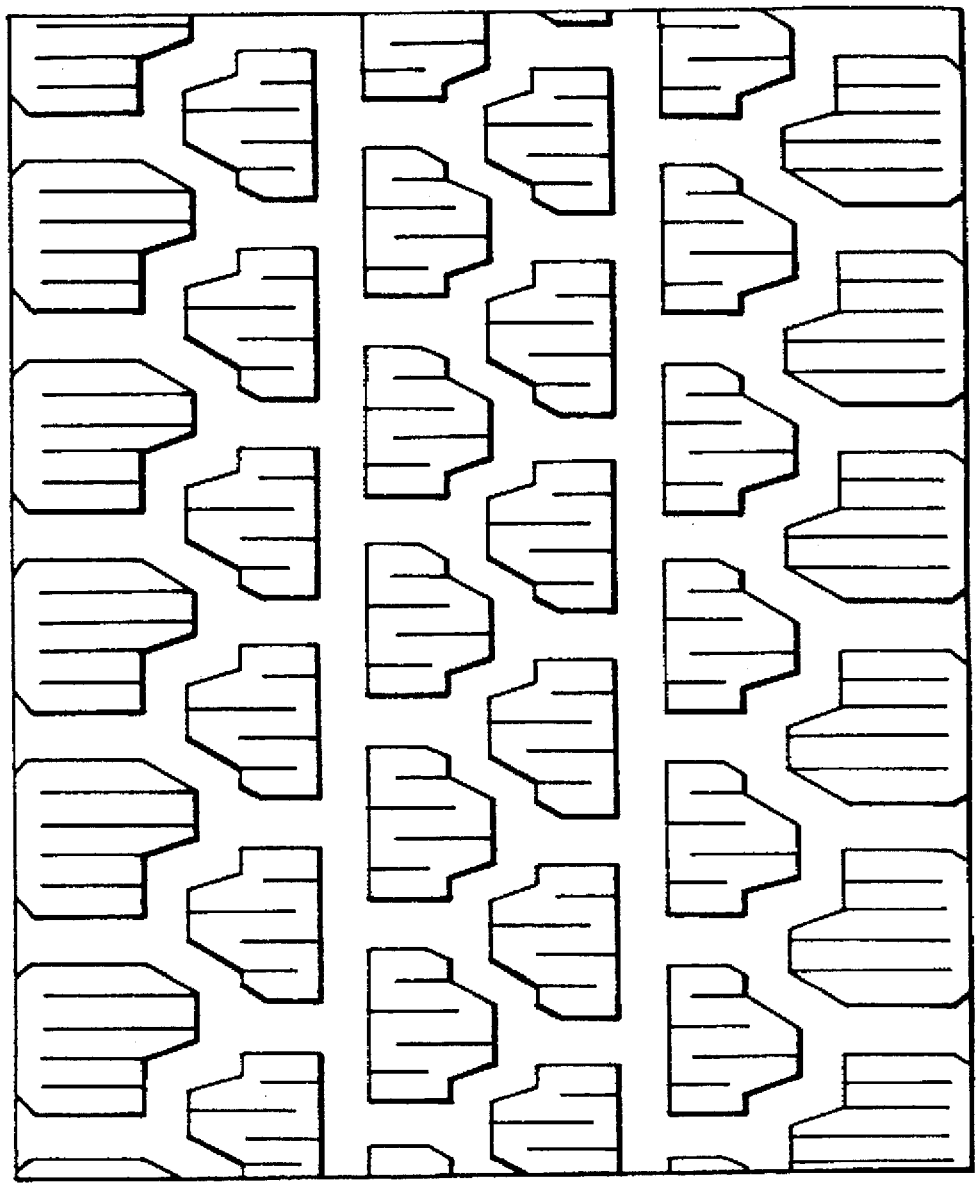

PNEUMATIC TIRES

BACKGROUND OF THE INVENTION

1. Field of the Invention

This invention relates to pneumatic tires running on icy and snowy roads, and more particularly to a pneumatic tire having excellent running performances on icy road without the degradation of running performances on a snowy road.

2. Description of the Related Art

In the conventional pneumatic tires for running on icy and snowy roads, a tread pattern as shown in FIG. 6 is known.

In such a tread pattern of the conventional pneumatic tire, zigzag grooves and straight grooves each continuously extending in a circumferential direction of the tire are alternately arranged in a widthwise direction of the tire, and a great number of lateral grooves for connecting the adjoining circumferential grooves to each other are arranged at a given interval in the circumferential direction of the tire to define a plurality of block rows. A plurality of lateral sipes are formed in each of the blocks. Therefore, this tire tentatively develops the running performances on both snow and ice roads.

In some cases, a snow road is apt to change into frozen road because of the changes in the weather and hence the friction coefficient of the road surface considerably lowers. To this end, it is strongly demanded to develop tires having considerably improved braking and turning performances on ice as compared with the conventional tire.

In order to improve the running performances on ice, it is effective to increase a ground contact surface area to decrease a negative ratio, while in order to improve the running performances on snow, it is effective to increase a groove area to increase a negative ratio. That is, the running performances on both ice and snow are basically antimonic relationship, so that it is very difficult to improve the running performances on ice without substantially degrading the running performances on snow.

Furthermore, it is effective to increase the number of sipes (density) to increase an edge component of the sipe in order to improve the running performances on ice. However, when the number of sipes (density) is too increased, the block rigidity lowers and hence the ground contact area is decreased by the bending deformation of the block, which may inversely bring about the degradation of the running performances on ice.

A foamed rubber as disclosed in JP-A-62-283001 is frequently used in a tread of a tire running on snow and ice roads. Since the foamed rubber is softer than the usual tread rubber, it is required to maintain the block rigidity in case of using the foamed rubber. Particularly, when the sipes are formed in the blocks of the tread composed of the foamed rubber, it is of urgent necessity to ensure the block rigidity.

SUMMARY OF THE INVENTION

It is, therefore, an object of the invention to provide pneumatic tires with a new tread pattern possessing excellent running performances on ice without the degradation of running performances on snow.

It is another object of the invention to provide a pneumatic tire having a tread pattern for running on ice and snow roads applicable to a tread composed of a relatively soft rubber such as the aforementioned foamed rubber or the like.

According to the invention, there is the provision of a pneumatic tire having a tread pattern defined in a tread portion by a pair of circumferential grooves dividing the tread portion into a central region and both side regions, a great number of slant grooves arranged in the central region at a given interval in a circumferential direction of the tire and a plurality of zigzag sipes arranged at a given interval in the circumferential direction in each block defined by the circumferential grooves and the slant grooves, the improvement wherein;

(1) each of the circumferential grooves is arranged in a position corresponding to about ¼–⅓ of a tread width as measured from an equatorial line of the tire;
(2) the slant grooves are first slant grooves having an inclination angle of 20°–30° with respect to the circumferential direction and second slant grooves having an inclination angle of 75°–85° with respect to the circumferential direction, provided that the inclination of the first slant groove is opposite to the inclination of the second slant groove with respect to the circumferential direction and a pitch length of the first slant groove in the circumferential direction is larger than that of the second slant groove; and
(3) the sipes has a width of not more than about 0.5 mm enough to close opposed sipe walls to each other under loading, respectively, and are arranged in parallel to each other or substantially extend in parallel with each other in the same block at an inclination angle of 70°–90° with respect to the circumferential direction, at least one end of each of which sipes opens to the circumferential groove or the first slant groove.

In a preferred embodiment of the invention, the sipes in the same block are alternately opened to the opposite grooves.

In another preferred embodiment of the invention, the tire has a negative ratio (ratio of total surface area of grooves in a full surface area of the tread) of 30–35%.

In the other preferred embodiment of the invention, at least a sipe adjacent to the second slant groove has a depth corresponding to about 35–60% of the sipe depth in the vicinity of an opening end.

In the still other preferred embodiment of the invention, the pitch length of the first slant groove in the circumferential direction is two times that of the second slant groove.

When the tire according to the invention is applied to a passenger car, it is preferable that a great number of lateral grooves opening at one end to the circumferential groove and at the other end to a tread end are arranged in each side region of the tread portion at a given interval in the circumferential direction to divide the side region into blocks and zigzag sipes are formed in each of the blocks, in which (1) each of the lateral grooves has an inclination angle of 70°–90° with respect to the circumferential direction and (2) the sipes have a width of not more than about 0.5 mm enough to close opposed sipe walls to each other under loading, respectively, and extend in the same block at an inclination angle of 70°–90° with respect to the circumferential direction, provided that one end of each of the sipes opens to the circumferential groove and the other end thereof terminates in the vicinity of the tread end. The second slant grooves include second slant grooves which are defined by a pair of straight edges and each lateral groove is defined by a pair of zigzag edges.

In the latter case, it is favorable that a foamed rubber as disclosed in JP-A-62-283001 is used in the tread portion of the tire. In other words, at least 10% by volume of the tread portion is the foamed rubber containing closed cells with an average cell size of 1–120 μm and having an expansion ratio of 1–100%.

BRIEF DESCRIPTION OF THE DRAWINGS

The invention will be described with reference to the accompanying drawings, wherein:

FIG. 4 is a diagrammatically section view taken along a line IV—IV in FIG. 1;

FIG. 5 is a diagrammatically section view taken along a line V—V in FIG. 1; and

FIG. 6 is a schematic view illustrating a typical tread pattern in the conventional pneumatic tire.

DESCRIPTION OF THE PREFERRED EMBODIMENTS

Figure 1:
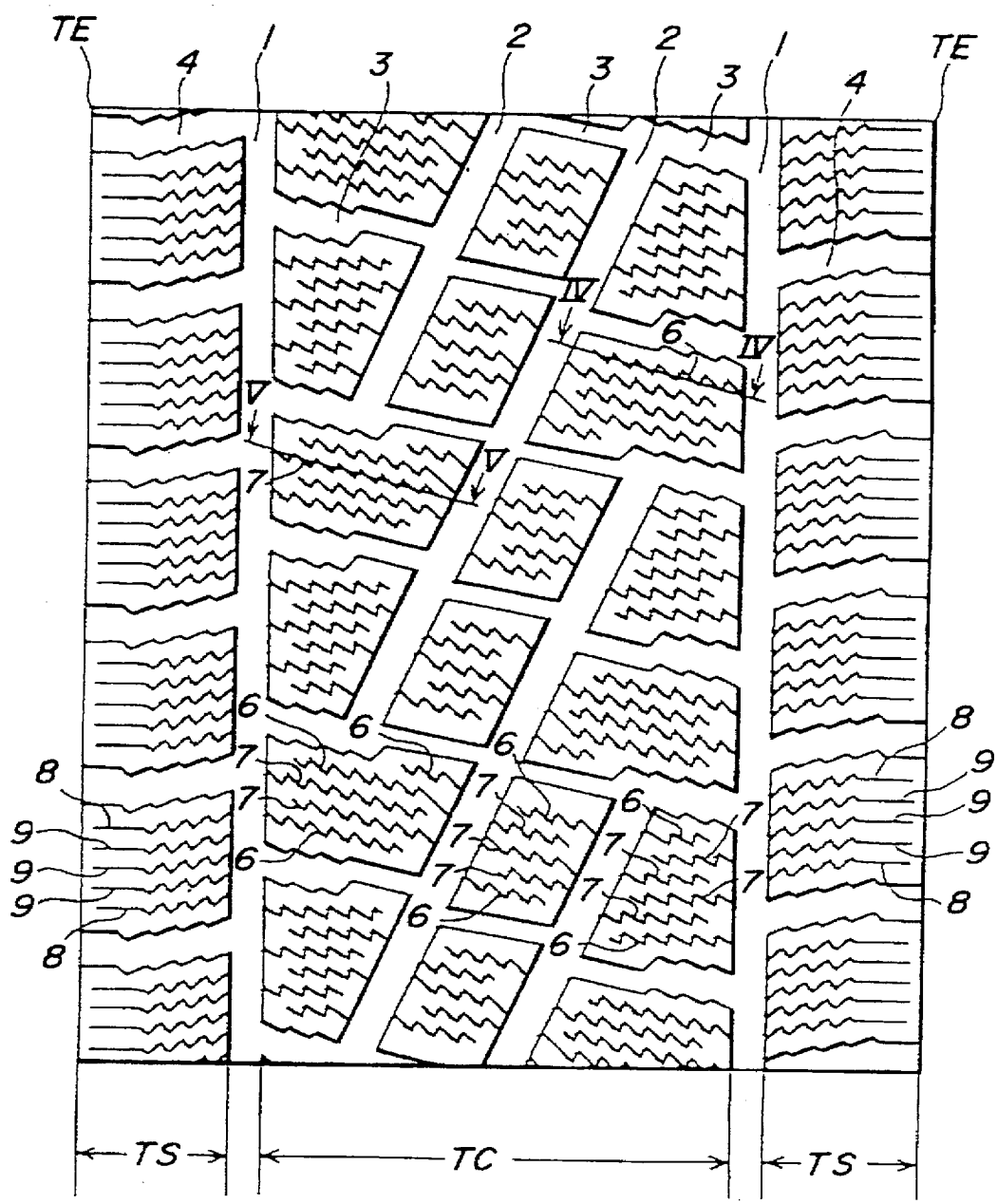
FIG. 1 is a schematic view illustrating a first embodiment of the tread pattern in the pneumatic tire according to the invention.

In the pneumatic tire according to the invention having the tread pattern as defined above, a pair of the circumferential grooves dividing the tread portion into the central region and both side regions serve to surely impart lateral gripping force (lateral grip) to the tire.

The reason why the position of the circumferential groove is limited to about ¼–⅓ of the tread width is due to the fact that lateral force effectively acts on a central region of the tread portion ranging within ¼–⅓ of the tread width and a space for arranging first slant grooves is ensured in such a central region.

As the slant groove arranged in the central region at a given interval in the circumferential direction, there are first slant grooves each having an inclination angle of 20°–30° with respect to the circumferential direction and second slant grooves each having an inclination angle of 75°–85° with respect to the circumferential direction. In the arrangement of the first and second slant grooves, the edge effect in the lateral direction of the tire or the more increase of the lateral gripping force is caused by an edge component of the slant groove in the circumferential direction of the tire, while the edge effect in the circumferential direction of the tire or the improvement of traction and braking performances on an ice road surface in forward and backward moving directions of vehicles is caused by an edge component of the slant groove in the lateral direction which is never existent in the circumferential straight groove.

If the inclination component of the slant groove is unidirectional, the straight running performance of the vehicle and the uneven wear resistance of the tire are degraded. On the contrary, according to the invention, the inclination of the first slant groove is opposite to the inclination of the second slant groove with respect to the circumferential direction, so that there is caused no fear of degrading the above performances.

When the inclination angle of the second slant groove is less than 75° with respect to the circumferential direction, the edge effect in the circumferential direction enough to develop the braking and traction performances on ice road surface can not be obtained, while when it exceeds 85°, the influence of the first slant groove upon the forward direction of the vehicle and others can not sufficiently be offset.

When the inclination angle of the first slant groove is less than 20°, there is no problem on the edge effect in the lateral direction of the tire, but the edge effect in the circumferential direction on the braking and traction performances in the forward and backward moving directions of the vehicle is extremely degraded, while when it exceeds 30°, the edge effect in the lateral direction is insufficient and there is a fear of causing lateral slipping.

The reason why the pitch length of the first slant groove in the circumferential direction is larger than that of the second slant groove is due to the fact that it is required to ensure the rigidity of the land portion defined between the first slant grooves.

Moreover, the reason why the negative ratio of the tire is limited to a range of 30–35% is due to the fact that when the negative ratio is less than 30%, each of the grooves becomes narrow to cause clogging and sufficient running performances on snow are not obtained, while when it exceeds 35%, the effective ground contact area lowers to degrade the running performances on ice.

In the pneumatic tire for a passenger car according to the invention, a plurality of zigzag sipes are arranged in parallel to each other or extend substantially in parallel with each other in the same block, so that the edge length is increased as compared with the straight sipe to enhance the edge effect and also the bending rigidity in the circumferential direction becomes large.

Furthermore, at least one end of each of the zigzag sipes is opened to the circumferential groove or the first slant groove, so that the opening ends of the zigzag sipes are opened in the ground contact area during the running on ice and snow road surfaces to more enhance the edge effect. And also, at least a zigzag sipe adjacent to the second slant groove has a depth corresponding to about 35–60% of the sipe depth in the vicinity of the opening end, so that sufficient rigidity is ensured in the opening end.

Moreover, the zigzag sipe has a width (clearance) of not more than about 0.5 mm, so that the opposed sipe walls of the zigzag sipe other than the opening end thereof are closed to each other in the ground contact area during the running on ice and snow road surfaces, whereby the block rigidity is enhanced.

As a result of the rigidity maintenance as mentioned above, a relatively soft rubber such as a foamed rubber disclosed in JP-A-62-283001 or the like can be applied to the tread of the pneumatic tire having the above tread pattern. Consequently, there can be provided pneumatic radial tires for passenger car developing an improved traction performance on ice road by the synergistic action of the foamed rubber and the zigzag sipes.

In the pneumatic tire according to the invention, a great number of lateral grooves opening at one end to the circumferential groove and at the other end to a tread end are arranged in each side region of the tread portion at a given interval in the circumferential direction to divide the side region into blocks and a plurality of zigzag sipes are formed in each of the blocks like the case of the tread central region, provided that one end of each of the sipes opens to the circumferential groove and the other end thereof terminates in the vicinity of the tread end, whereby the block rigidity at the tread end required in the cornering is particularly ensured.

The inclination angle of the lateral groove is restricted to 70°–90° for substantially the same reasons as in the second slant groove. Particularly, when the inclination angle is less than 70°, the edge effect in front and back moving directions becomes insufficient. On the other hand, the width of the sipe is restricted to not more than 0.5 mm for substantially the same reason as in the arrangement of the sipes in the central region.

Figure 2:
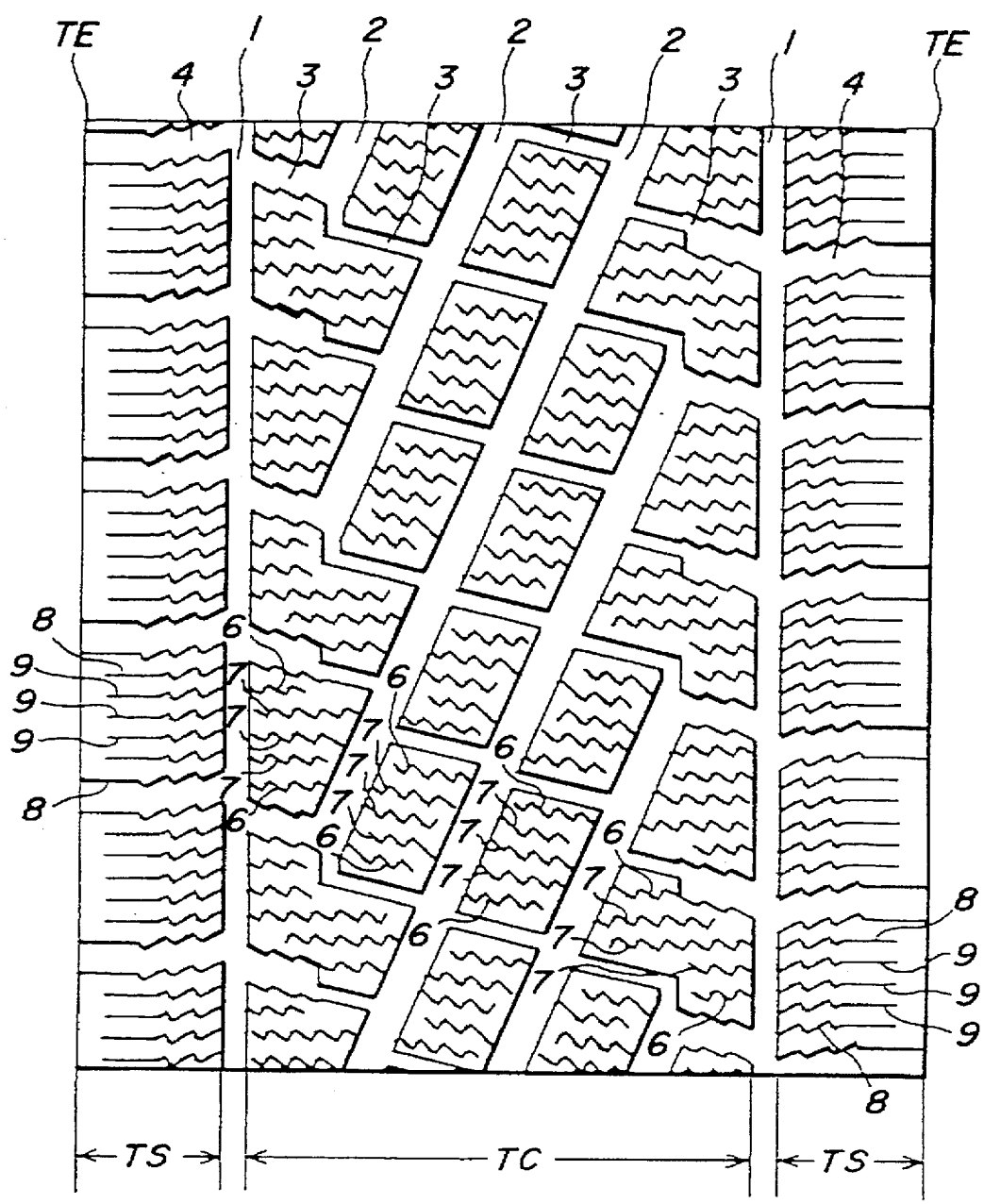
FIG. 2 is a schematic view illustrating a second embodiment of the tread pattern in the pneumatic tire according to the invention.
Figure 3:
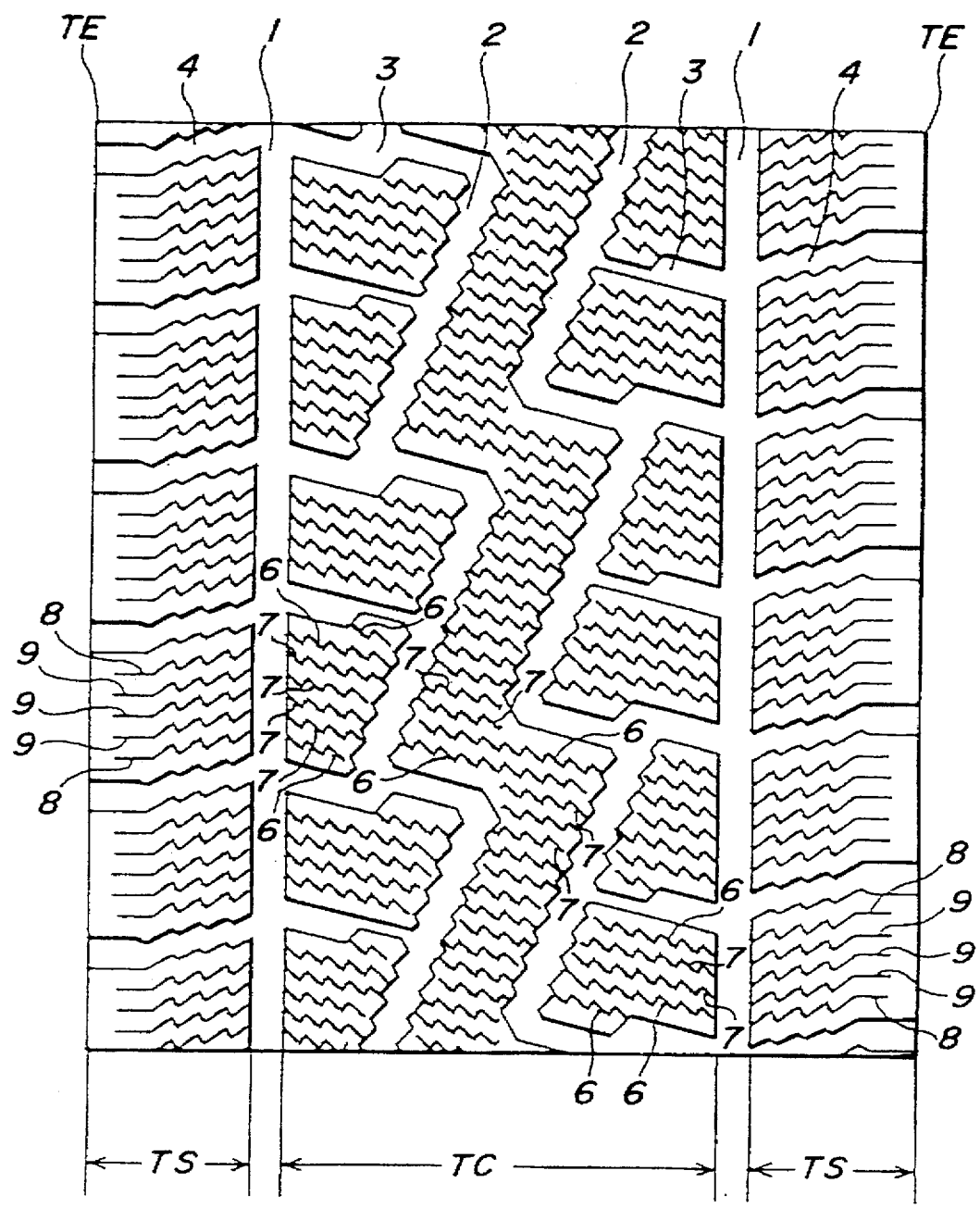
FIG. 3 is a schematic view illustrating a third embodiment of the tread pattern in the pneumatic tire according to the invention.

In FIGS. 1–3 are shown various embodiments of the tread pattern in the pneumatic radial tire for passenger car according to the invention, respectively. This tire has a tire size of 185/70R13 and a tread width of about 150 mm.

In the first embodiment of the tread pattern shown in FIG. 1, the tread portion is divided by a pair of circumferential grooves 1 into a central region TC and both side regions TS, and a great number of slant grooves 2, 3 are arranged in the central region TC at a given interval in the circumferential direction of the tire, and a plurality of zigzag sipes 6, 7 are arranged in each of blocks defined by the circumferential grooves 1 and the slant grooves 2, 3 at a given interval in the circumferential direction. The negative ratio of this pattern is 33%.

Each of the circumferential grooves 1 has a groove width of 6.5 mm and is arranged at a position of 45 mm apart from an equatorial line of the tire, which corresponds to 30% of the tread width (150 mm).

As the slant groove, first slant grooves 2 each having an inclination angle of 25° with respect to the circumferential direction and second slant grooves 3 each having an inclination angle of 80° with respect to the circumferential direction are arranged so that the inclination of the first slant groove 2 is opposite to the inclination of the second slant groove 3 with respect to the circumferential direction and the pitch length of the first slant groove 2 in the circumferential direction is 2 times that of the second slant groove 3.

The groove width of the first slant groove 2 is 6.5 mm, while the groove width of the second slant groove 3 is 6 mm at both side portions of the central region TC defined by the circumferential grooves 1 and 3–4 mm toward a central portion.

The zigzag sipes 6, 7 have a width of 0.5 mm and extend in parallel with each other at an inclination angle of 80° or 90° with respect to the circumferential direction in the same block, one end of each of which sipes is opened to the circumferential groove 1 or the first slant groove 2.

FIGS. 4 and 5 are schematically section view taken along lines IV—IV and V—V of FIG. 1, respectively. As shown in FIG. 4, the zigzag sipe 6 adjacent to the second slant groove 3 has a depth (b) of 7 mm but the depth (c) in the vicinity of the opening end is 3 mm corresponding to about 43% of the depth (b). As shown in FIG. 5, each of the zigzag sipes 7 has the depth (b) of 7 mm even in the vicinity of the opening end. Moreover, a groove depth (a) of each of the circumferential grooves 1 and the first slant groove 2 is 9.5 mm.

In each side region TS, a great number of lateral grooves 4 having an inclination angle of 80° with respect to the circumferential direction and opening at one end to the circumferential groove 1 and at the other end to a tread end TE are arranged at a given interval in the circumferential direction. The inclination of the lateral groove 4 is opposite to the inclination of the second slant groove 3 located in the central region TC with respect to the circumferential direction.

A plurality of zigzag sipes 8, 9 are formed in each of blocks defined by the lateral grooves 4 likewise the case of arranging the zigzag sipes 6, 7 in the block of the central region TC. In this case, each of the sipes 8, 9 has a width of 0.5 mm and is opened at one end to the circumferential groove 1 but terminates at the tread end.

The second embodiment of the tread pattern shown in FIG. 2 is basically the same as in the first embodiment of FIG. 1 except that the pitch length of the first slant groove 2 is 1.5 times that of the second slant groove 3 and the groove width of the first slant groove 2 is increased from 6.5 mm to 7.5 mm and the groove width of the circumferential groove 1 is decreased from 6 mm to 4.5 mm. In this case, the negative ratio is as unchangeable as 33%.

The third embodiment of the tread pattern shown in FIG. 3 is basically the same as in the first embodiment of FIG. 1 except that central blocks in the central region TC are continuously extended in the circumferential direction and the groove width of each of the slant grooves is narrowed so that the negative ratio is reduced to 30%.

The conventional pneumatic tire has the typical tread pattern as shown in FIG. 6, in which the tire size (185/70R13) and tread width (150 mm) are the same as in the above embodiments. In the illustrated tread pattern, three zigzag grooves and two straight grooves continuously extending in the circumferential direction are alternately arranged at a given interval in the widthwise direction of the tire and a plurality of lateral grooves connecting the adjoining circumferential grooves to each other are arranged at a given interval in the circumferential direction to define a plurality of block rows and plural lateral sipes are formed in each block of these block rows.

Then, the tests for the evaluation of feeling property on snow, braking performance on ice and cornering performance on ice are carried out under an internal pressure of 2.0 kgf/cm$^2$ with respect to the pneumatic radial tires for passenger cars of Examples 1–3 shown in FIGS. 1–3 and Conventional Example shown in FIG. 6, respectively. The feeling property on snow is a total feeling evaluation of braking performance, traction, straight running performance and cornering performance on a snowed test course, and the braking performance on ice is a running distance after the full braking from a running state at a speed of 20 km/h on an ice bound course, and the cornering performance on ice is a time required in the turning on an ice bound course at a circle of 20 m in radius.

The evaluation results are shown in Table 1. Moreover, the result is represented by an index on the basis that the conventional example is 100. The larger the index value, the better the result.

TABLE 1

|  | Conventional Example | Example 1 | Example 2 | Example 3 |
|---|---|---|---|---|
| Feeling property on snow | 100 | 100 | 98 | 95 |
| Braking performance on ice | 100 | 115 | 117 | 120 |
| Cornering performance on ice | 100 | 105 | 108 | 110 |

As seen from the results of Table 1, the tires of Examples 1–3 according to the invention are equal to or slightly lower that the conventional tire in the running performances on snow, but are considerably better in the running performances on ice as compared with the conventional tire.

As mentioned above, according to the invention, the running performances on ice road of the pneumatic tire having a tread pattern defined by circumferential grooves, slant grooves and zigzag sipes can considerably be improved without substantially degrading the running performances on a snowy road by arranging first slant grooves having a particular small inclination angle and second slant grooves having a particular large inclination angle with respect to the circumferential direction so as to make the inclinations of the first and second slant grooves opposite to each other and arranging the zigzag sipes having a width of not more than 0.5 mm in the same block so as to be in parallel to each other or extend substantially in parallel with each other and open at least one end of the sipe to the circumferential groove or the first slant groove.

What is claimed is:

1. A pneumatic tire comprising a tread pattern defined in a tread portion by a pair of circumferential grooves dividing the tread portion into a central region and two side regions, a plurality of slant grooves arranged in the central region at a predetermined interval in a circumferential direction of the tire and a plurality of zigzag sipes arranged at a predetermined interval in the circumferential direction in blocks defined by the circumferential grooves and the slant grooves, wherein, (1) each of the circumferential grooves is arranged in a position corresponding to about ¼–⅓ of a tread width as measured from an equatorial line of the tire;

(2) the slant grooves comprise first slant grooves having an inclination angle of 20°–30° with respect to the circumferential direction, and second slant grooves having an inclination angle of 75°–85° with respect to the circumferential direction, the inclination of the first slant grooves is opposite to the inclination of the second slant grooves with respect to the circumferential direction, and a pitch length of the first slant grooves in the circumferential direction is larger than that of the second slant grooves; and (3) the sipes has a width of not more than about 0.5 mm so that opposed sipe walls close to each other under loading, respectively, and are arranged in parallel to each other or substantially extend in parallel with each other in the same block at an inclination angle of 70°–90° with respect to the circumferential direction, at least one end of each of which sipes opens to the circumferential groove or one of the first slant grooves;

wherein a portion of a sipe adjacent to the second slant groove has a first sipe depth corresponding to about 35–60% of a second sipe depth in the vicinity of an opening end.

2. A pneumatic tire according to claim 1, wherein the zigzag sipes in the same block are alternately opened to the opposite grooves.

3. A pneumatic tire according to claim 1, wherein the tire has a negative ratio of 30–35%.

4. A pneumatic tire according to claim 4, wherein said first depth is about 43% of said second depth.

5. A pneumatic tire according to claim 1, wherein the pitch length of the first slant grooves in the circumferential direction is two times that of the second slant grooves.

6. A pneumatic tire according to claim 1, wherein a plurality of lateral grooves opening at one end to the circumferential groove and at the other end to a tread end are arranged in each side region of the tread portion at a given interval in the circumferential direction to divide the side region into blocks and zigzag sipes are formed in each of the blocks, in which (1) each of the lateral grooves has an inclination angle of 70°–90° with respect to the circumferential direction and (2) the sipes have a width of not more than about 0.5 mm so that opposed sipe walls close to each other under loading, respectively, and extend in the same block at an inclination angle of 70°–90° with respect to the circumferential direction, wherein one end of each of the sipes opens to the circumferential groove and the other end thereof terminates in the vicinity of the tread end.

7. A pneumatic tire according to claim 1, wherein at least 10% by volume of the tread portion is a foamed rubber containing closed cells with an average cell size of 1–120 μm and having an expansion ratio of 1–100%.

8. A pneumatic tire comprising a tread pattern defined in a tread portion by a pair of circumferential grooves dividing the tread portion into a central region and two side regions, a plurality of slant grooves arranged in the central region at a predetermined interval in a circumferential direction of the tire and a plurality of zigzag sipes arranged at a predetermined interval in the circumferential direction in blocks defined by the circumferential grooves and the slant grooves, wherein, (1) each of the circumferential grooves is arranged in a position corresponding to about ¼–⅓ of a tread width as measured from an equatorial line of the tire;

(2) the slant grooves comprise first slant grooves having an inclination angle of 20°–30° with respect to the circumferential direction, and second slant grooves having an inclination angle of 75°–85° with respect to the circumferential direction, the inclination of the first slant grooves is opposite to the inclination of the second slant grooves with respect to the circumferential direction, and a pitch length of the first slant grooves in the circumferential direction is larger than that of the second slant grooves, the second slant grooves include second slant grooves which are defined by a pair of straight edges; and (3) the sipes has a width of not more than about 0.5 mm so that opposed sipe walls close to each other under loading, respectively, and are arranged in parallel to each other or substantially extend in parallel with each other in the same block at an inclination angle of 70°–90° with respect to the circumferential direction, at least one end of each of which sipes opens to the circumferential groove or one of the first slant grooves;

wherein a plurality of lateral grooves opening at one end to the circumferential groove and at the other end to a tread end are arranged in each side region of the tread portion at a given interval in the circumferential direction to divide the side region into blocks and zigzag sipes are formed in each of the blocks, in which (1) each of the lateral grooves has an inclination angle of 70°–90° with respect to the circumferential direction and (2) the sipes have a width of not more than about 0.5 mm so that opposed sipe walls close to each other under loading, respectively, and extend in the same block at an inclination angle of 70°–90° with respect to the circumferential direction, wherein one end of each of the sipes opens to the circumferential groove and the other end thereof terminates in the vicinity of the tread end, and wherein each lateral groove is defined by a pair of zigzag edges.

* * * * *